Patented Nov. 10, 1931

1,831,251

UNITED STATES PATENT OFFICE

COULTER W. JONES, OF MIDLAND, MICHIGAN, ASSIGNOR TO THE DOW CHEMICAL COMPANY, OF MIDLAND, MICHIGAN, A CORPORATION OF MICHIGAN

METHOD OF OBTAINING STRONTIUM FROM MIXED SOLUTIONS

No Drawing. Application filed August 29, 1927. Serial No. 216,333.

This invention relates to the obtaining of strontium compounds from mixed solutions, and particularly from brines including calcium chloride, and it is among the objects of the invention to provide a method making possible such separation in a manner not requiring elaborate precipitations with added agents, etc. Other objects and advantages will appear as the description proceeds.

To the accomplishment of the foregoing and related ends, the invention, then consists of the features hereinafter fully described, and particularly pointed out in the claims, the following description setting forth in detail but one of the various ways in which the principle of the invention may be employed.

Strontium present even in relatively small amounts in brines containing calcium chloride and other chlorides may be largely separated therefrom by selective crystallization under controlled conditions of concentration and temperature. The method is applicable in general to mixed brines containing calcium, magnesium, and strontium chlorides and is particularly applicable to separation of strontium from mother liquors obtained from natural or mixed brines containing calcium chloride from which sodium chloride has been removed by concentration and salting out and which may or may not have also been worked for magnesium chloride or other salts present.

In general I concentrate the brine to remove the sodium chloride, if present, by salting out and filtration. If magnesium chloride be present in considerable amounts it may be removed largely as tachydrite by concentration and cooling to about 60° C. The mother liquor contains principally calcium chloride and most of the strontium originally present. If this liquor or mixed chloride liquors containing strontium have a strength such that when cooled, they will become saturated as to hydrated chlorides of calcium and strontium, a crop of crystals will separate out containing the strontium in higher proportion than in the original liquor. For example, a brine containing approximately 10 parts of calcium chloride to 1 part $MgCl_2$ and 1% strontium chloride or less, from which brine salt has been previously removed will, if brought to a gravity of approximately 49° Bé. at 46° C., and then cooled to about 31° C., separate out a crop of hydrated crystals of calcium and strontium containing chiefly calcium chloride but also containing about 60% of the strontium originally present. If a larger percentage of magnesium chloride were present, this excess would also separate out with the hydrated chlorides.

With a solution of that concentration I prefer to stop the cooling short of a temperature where it becomes saturated as to $CaCl_2 \cdot 6H_2O$. That temperature is about 30.2° C., for a saturated pure water solution, but for a solution of mixed chlorides the transition temperature may be slightly different.

Slow cooling near the saturation point is advisable and it is desirable also to agitate the solution. Depending upon the particular relative concentrations, the crystals may run very low in strontium chloride and in such event they may be recrystallized, to concentrate the strontium salt or they may be further concentrated by selective melting and draining. Preferably I separate the crop of crystals from the mother liquor, and heat to melt a portion which runs away as a strong calcium chloride solution, leaving the strontium in higher concentration.

The cooling to produce the crystals containing strontium may indeed be carried to a point below the temperature at which $CaCl_2 \cdot 6H_2O$ will separate. This procedure produces a larger crop relative to the actual strontium removed, although with a sufficient total a larger extraction of strontium may thereby be had. Selective melting may then be practiced to concentrate the strontium content in the remaining crystals, the leachings being returned to the cooling step for recrystallization. To obtain the strontium in higher concentrations recrystallizations of the residue may be resorted to.

The above example illustrates procedure applied to concentrated solutions where the cooling range is limited to around 31° C., but by choosing solutions of less concentration crystallizations of the crop containing the strontium may be practiced at lower temperatures.

This invention is especially advantageous in removing strontium from mother liquors left from the separation of magnesium chloride in the form of tachydrite, but its advantages may also be realized with other solutions such as mixed or natural brines containing calcium chloride, magnesium chloride, strontium chloride, and other salts, and in instances of salts other than chlorides it may be applied also by first converting the contained salts to chlorides.

Other modes of applying the principle of the invention may be employed, change being made as regards the details disclosed, provided the steps stated by any of the following claims or the equivalent of such be employed.

I therefore particularly point out and distinctly claim as my invention:—

1. A method of removing strontium salts from mixed solutions containing calcium and magnesium chlorides in the approximate ratio of 10 to 1 and having a gravity of 48° Bé. to 49° Bé. at 46° C. which comprises cooling such solution to about 31° C. while agitating, separating the crystals formed, and further purifying the strontium chloride so crystallized.

2. A method of removing strontium chloride from a solution containing calcium chloride wherein the former is present in relatively small proportion to the latter which comprises concentrating such solution to saturation with respect to calcium chloride at a temperature of about 31° C., or lower, and cooling such concentrated solution to a temperature not materially lower than the aforesaid point of saturation whereby crystals of the hydrated mixed chlorides of calcium and strontium are precipitated containing the strontium in greater proportion than in the original solution.

3. A method of removing strontium chloride from a solution containing calcium chloride wherein the former is present in relatively small proportion to the latter which comprises concentrating such solution to saturation with respect to calcium chloride at a temperature of about 31° C., or lower, cooling such concentrated solution to a temperature not materially lower than the aforesaid point of saturation whereby crystals of the hydrated mixed chlorides of calcium and strontium are precipitated containing the strontium in greater proportion than in the original solution, separating the crystals and further purifying the same to increase the strontium chloride content thereof.

4. A method of removing strontium chloride from a solution containing calcium chloride wherein the former is present in relatively small proportion to the latter which comprises concentrating such solution to saturation with respect to calcium chloride at a temperature of about 31° C., or lower, cooling such concentrated solution to a temperature not materially lower than the aforesaid point of saturation whereby crystals of the hydrated mixed chlorides of calcium and strontium are precipitated containing the strontium in greater proportion than in the original solution, separating the crystals, partially melting the same and separating the liquid from the residual crystals containing a further increased proportion of strontium chloride.

5. In a method of separating strontium chloride from a mixture of same with crystals of calcium chloride hexahydrate, the steps which consist in partially melting such crystals and separating the liquid from the residual crystals containing a higher percentage of strontium chloride than the original crystals.

Signed by me this 19th day of August, 1927.

COULTER W. JONES.